United States Patent Office 3,163,639
Patented Dec. 29, 1964

3,163,639
4-THIO-2'-DEOXYURIDINE
George H. Hitchings, Yonkers, Gertrude B. Elion, Bronxville, and Samuel Bieber, Spring Valley, N.Y., assignors to Burroughs Wellcome & Co. (U.S.A.) Inc., Tuckahoe, N.Y., a corporation of New York
No Drawing. Filed Jan. 22, 1963, Ser. No. 253,051
Claims priority, application Great Britain Jan. 24, 1962
1 Claim. (Cl. 260—211.5)

This invention relates to substances and combinations of substances that interfere with the immune response, and are of potential value, for example, in prolonging the survival of transplanted organs and in controlling auto-immune diseases including auto-immune haemolytic anaemias and lupus erythematosus.

It has recently been shown that two mercaptopurines, 6-mercaptopurine and 6-thioguanine, have beneficial effects in a variety of auto-immune diseases in man, and prolong the survival of transplanted kidneys in the dog. Such transplanted kidneys ordinarily survive only 10–14 days; but with the administration of a mercaptopurine, they continue to function for several months after transplantation. The mercaptopurines, however, are of limited value for this purpose, primarily because of their effects on the bone marrow and the fact that for adequate suppression of the immune response of the host it is necessary to give doses close to the toxic level.

In order to find substances with superior therapeutic effectiveness and lower side effects, compounds have been tested for their ability to suppress the formation of haemagglutinins in mice following the injection of tanned sheep red blood cells. The purines of Formula I, including the two mercaptopurines and some 6-thiopurine derivatives claimed in U.S. patent application Serial Nos. 853,686 and now abandoned and 141,582, are active in this test and have been shown also to have activity in prolonging the survival of transplanted kidneys in dogs.

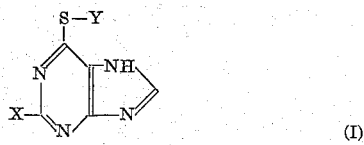

(I)

In Formula I, X is a hydrogen atom or an amino group, and Y is a hydrogen atom, a 4-carboxy-2-nitrophenyl or 2,4-dinitrophenyl group or a group of the formula

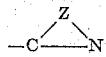

in which Z is a chain of 3 or 4 atoms, of which one is carbon, nitrogen or sulphur and the remainder are carbon, completing an unreduced hetercyclic ring in which nitrogen atoms may bear alkyl or optionally nitrated aralkyl substituents, carbon atoms may bear methyl, carboxy, amino, nitro, hydroxy or halogen substituents, two adjacent carbon atoms may bear a fused benzene or imidazole ring, and one carbon atom adjacent to a nitrogen atom in the ring may bear a further 6-purinylthio or 2-amino-6-purinylthio group. The purines of Formula I in which Y is a 1-methyl-4-nitro-5-imidazolyl group are especially effective.

It has now been found that 5-bromo-2'-deoxyuridine and 2'-deoxy-4-thiouridine, two antimetabolites related to the pyrimidine deoxynucleosides of deoxyribonucleic acid, also show activity and moreover are capable of potentiating the activity of 6-mercaptopurine and other purines of Formula I. 2'-deoxy-4-thiouridine as a new substance and may be produced by the treatment of 3'-5'-di-O-acyl-2'-deoxyuridine with phosphorus pentasulphide followed by de-acylation.

These deoxyuridines may act by destroying rapidly multiplying clones of the cells responsible for immune reactions, or by interfering with the formation of certain melecular templates that are necessary for antibody production, but their use is not contingent on theories of their mechanisms of action.

5-bromo-2'-deoxyuridine and 2'-deoxy-4-thiouridine are presented as pharmaceutical formulations singly or in combination with a purine of Formula I. Advantageously they are presented in discrete units, such as tablets, capsules, ampoules or suppositories, each containing a predetermined amount of the deoxyuridine. The deoxyuridine may also be presented as a powder or granules, as a solution or suspension in an aqueous, non-aqueous or emulsified liquid, or as an ointment. For parenteral use, the formulations must be sterile and are presented in sealed containers. The formulations of this invention may be made by any of the methods of pharmacy, and may include one or more of the following accessory ingredients: diluents, solutes, buffers, flavoring, binding, dispersing, surface-active, thickening, lubricating, and coating materials, preservatives, antioxidants, bacteriostats, suppository and ointment bases, and any other acceptable excipients.

For example tablets or sterile injectable solutions may contain the deoxyuridine in combination with 6-mercaptopurine, in ratios of 5-bromo-2'-deoxyuridine to 6-mercaptopurine between 5:1 and 1:10, and ratios of 2'-deoxy-4-thiouridine to 6-mercaptopurine between 4:1 and 1:1.

The following experiment illustrates the testing procedure and shows the activity of 5-bromo-2'-deoxyuridine and the potentiation which results when it is used in combination with 6-mercaptopurine.

Mice were injected intravenously on day 0 with 0.25 ml. of a 30% suspension of tanned sheep red cells, and treated with drug on days 0, 1, 2 and 3. The content of haemagglutinins in the serum of the blood of the mice was measured on day 12, and scored as an index which is a function of the haemagglutination score and the dilution of the serum, being higher the greater the content of haemagglutinins. The value of the index in the control without therapy is set at unity, and is 0.18 in the controls without sheep red cells. A value of the index of 0.50 or less is considered to indicate activity. (See H. C. Nathan, S. Bieber, G. B. Elion and G. H. Hitchings, "Detection of Agents which Interfere with the Immune Response," Proceedings of the Society for Experimental Biology and Medicine (1961), 107, 796–799.)

The values of the index obtained with various doses of 5-bromo-2'-deoxyuridine and 6-mercaptopurine are given in the following table.

| 5-Bromo-2'-deoxyuridine, Daily dose, mg./kg. | 6-Mercaptopurine, Daily dose, mg./kg. | | | |
|---|---|---|---|---|
| | 0 | 8.3 | 25 | 75 |
| 0 | 1.00 | 0.90 | 0.52 | 0.32 |
| 3 | 0.88 | 0.63 | 0.30 | 0.34 |
| 10 | 0.62 | 0.46 | 0.28 | 0.16 |
| 30 | 0.37 | 0.43 | 0.25 | 0.09 |
| 60 | 0.25 | | | |

Those obtained with various doses of 5-bromo-2'-deoxyuridine and thioguanine are given in the following table.

| BUDR, Daily dose, mg./kg. | Thioguanine, Daily dose, mg./kg. | | | |
|---|---|---|---|---|
| | 0 | .3 | 1 | 3 |
| 0 | 1.00 | .74 | .32 | .20 |
| 3 | .77 | .16 | .15 | .10 |
| 10 | .37 | .20 | .12 | .09 |
| 30 | .25 | .15 | .10 | .10 |

5-bromo-2'-deoxyuridine is active at 30 and 60 mg./kg. At 120 mg./kg., it gave an index of 0.19 with toxicity (death of 2 of 5 mice). 6-mercaptopurine is active at 75 mg./kg., but at 25 mg./kg. it gives a borderline response. Combinations of 6-mercaptopurine and 5-bromo-2'-deoxyuridine are strikingly more active. Thus the combination of 6-mercaptopurine at 25 mg./kg. (one-third of an active dose) plus 5-bromo-2'-deoxyuridine at 3 mg./kg. (one-tenth of an active dose) is active, and so are a number of other combinations of individually inactive doses of the two drugs. Perhaps more significant are the very low values of the index obtained by the addition of 5-bromo-2'-deoxyuridine to an active dose of 6-mercaptopurine, where in two instances (6-mercaptopurine at 75 mg./kg. plus 5-bromo-2'-deoxyuridine at 10 or 30 mg./kg.) the immune response is essentially completely suppressed.

The high activity of 5-bromo-2'-deoxyuridine both alone and in combination with 6-mercaptopurine is unique in that 5-chloro-2'-deoxyuridine and 2'-deoxy-5-iodouridine are inactive in these respects, although the three 2-deoxy-5-halogenouridines have quite similar antitumor activities.

The new substance 2'-deoxy-4-thiouridine has antiimmune activity in the above-described test at a dose of 100 mg./kg. while its maximum tolerated dose is greater than 400 mg./kg. The values of the index obtained with 2'-deoxy-4-thiouridine and 6-mercaptopurine alone and in combination are given in the following table.

| 2'-Deoxy-4-thiouridine, Daily dose, mg./kg. | 6-Mercaptopurine, Daily dose mg./kg. | |
|---|---|---|
| | 0 | 25 |
| 0 | 1.00 | 0.72 |
| 50 | 0.84 | 0.32 |

The combination is clearly synergistic.

The following examples illustrate the invention. Temperatures are in degrees Celsius, and the figures in parentheses in the spectral data are the optical densities observed at a concentration of 10 mg./litre.

EXAMPLE 1

*2'-Deoxy-4-Thiouridine*

A mixture of 8 g. 2'-deoxyuridine (0.0352 mole) and 210 ml. dry pyridine was heated to 50–55° with stirring, and 9.0 ml. benzoyl chloride (0.0775 mole) was introduced over a period of several hours. The mixture was stirred at 50–55° for 2 days with exclusion of water. It was then poured on to 1 kg. chopped ice. The colorless powdery precipitate was collected by filtration, washed with cold water and dried in a vacuum desiccator to give 13.0 g. 3',5'-di-O-benzoyl-2'-deoxyuridine (84.3% yield), M.P. 219–222°.

12.5 g. 3',5'-di-O-benzoyl-2'-deoxyuridine (0.0287 mole) was added with stirring to a solution of 24 g. powdered phosphorus pentasulphide in 325 ml. dry redistilled pyridine at 50°. The mixture was then heated under reflux with stirring for 5 hours. 150 ml. pyridine was removed under reduced pressure and the residue was poured into 1200 ml. cold water. The dark brown precipitate which formed was collected and triturated with 300 ml. chloroform. The chloroform extract was washed with two 125 ml. portions of water, dried over sodium sulphate, and evaporated to dryness leaving a light brown residue (9.0 g.), M.P. 97–100°. This was recrystallized from 500 ml. absolute ethanol to give 3',5'-di-O-benzoyl-2'-deoxy-4-thiouridine as pale yellow needles, M.P. 128–131°.

A solution of 5.8 g. 3',5'-di-O-benzoyl-2'-deoxy-4-thiouridine in 125 ml. anhydrous methanol was heated under reflux, and 16 ml. N sodium methoxide in methanol was added slowly over a 4-hour period so as to maintain a pH value of 8. The pH value was adjusted to 5 by the addition of 0.4 ml. glacial acetic acid, and the solution was evaporated to dryness under reduced pressure. The residue was dissolved in 80 ml. water and extracted with four 60 ml. portions of chloroform to remove methyl benzoate and any 3',5'-di-O-benzoyl-2'-deoxy-4-thiouridine. The aqueous solution was treated with charcoal, filtered, and evaporated to dryness under reduced pressure. The pale yellow solid residue was extracted with twelve 25 ml. portions of acetone and the residual salts were filtered off. Evaporation of the acetone extract gave 2.65 g. 2'-deoxy-4-thiouridine, M.P. 154–155° (decomp.), having ultraviolet absorption maxima at 245 m$\mu$ (0.160) and 331 m$\mu$ (0.782) at pH 1 and at 233 m$\mu$ (0.235) and 312 m$\mu$ (0.720) at pH 11.

EXAMPLE 2

*Tablets*

A mixture of finely powdered 5-bromo-2'-deoxyuridine (20 parts), starch (30 parts) and lactose (150 parts) was granulated with an aqueous alcoholic gelatin solution. The granules were mixed with sufficient magnesium stearate and compressed on a suitable die into tablets, each containing 20 mg. 5-bromo-2'-deoxyuridine.

Tablets, each containing 20 mg. 5-bromo-2'-deoxyuridine and 50 mg. 6-mercaptopurine, were similarly prepared from 5-bromo-2'-deoxyuridine (20 parts), 6-mercaptopurine (50 parts), starch (30 parts) and lactose (100 parts).

Tablets, each containing 50 mg. 2'-deoxy-4-thiouridine, were similarly prepared from 2'-deoxy-4-thiouridine (50 parts), starch (30 parts) and lactose (120 parts).

EXAMPLE 3

*Ampoules of Injectable Solution*

A sterile, nearly neutral and isotonic 2% w./v. solution of 5-bromo-2'-deoxyuridine in pyrogen-free distilled water was filled under sterile conditions into ampoules, 1.0 ml. per ampoule, and the ampoules were then sealed.

What we claim is:
4-thio-2'-deoxyuridine.

References Cited in the file of this patent

UNITED STATES PATENTS

| 2,756,228 | Hitchings | July 24, 1956 |
| 2,875,203 | Shive | Feb. 24, 1959 |
| 2,952,539 | Dersch | Sept. 13, 1960 |
| 3,044,934 | Wilkinson | July 17, 1962 |
| 3,044,935 | Kamada | July 17, 1962 |

OTHER REFERENCES

Chem. Abst., vol. 54, 1960, pp. 8831(b) and 12,146(a).
Bieber et al.: "Proc. Soc. Exp. Biol. Med.," vol. 111, November 1962, pp. 334–337.